(12) United States Patent
Caswell et al.

(10) Patent No.: US 12,054,175 B2
(45) Date of Patent: Aug. 6, 2024

(54) AUTOMATED VEHICLE CONDITION GRADING

(71) Applicant: IAA Holdings, LLC, Lincoln, NE (US)

(72) Inventors: Shawn Caswell, Bolingbrook, IL (US); Meggan O'Malley, Mokena, IL (US); Stephen Muscarello, North Barrington, IL (US); Michael Cornelison, LaGrange Highlands, IL (US)

(73) Assignee: IAA Holdings, LLC, Lincoln, NE (US)

( * ) Notice: Subject to any disclaimer, the term of this patent is extended or adjusted under 35 U.S.C. 154(b) by 0 days.

(21) Appl. No.: 17/850,047

(22) Filed: Jun. 27, 2022

(65) Prior Publication Data

US 2023/0071474 A1    Mar. 9, 2023

Related U.S. Application Data

(63) Continuation of application No. 17/506,698, filed on Oct. 21, 2021, now Pat. No. 11,377,117.

(Continued)

(51) Int. Cl.
*B60W 60/00* (2020.01)
*G06N 20/00* (2019.01)
(Continued)

(52) U.S. Cl.
CPC ........... *B60W 60/001* (2020.02); *G06N 20/00* (2019.01); *G06V 20/56* (2022.01); *B60W 2420/403* (2013.01)

(58) Field of Classification Search
CPC  B60W 60/001; B60W 2420/42; G06N 20/00; G06N 20/20; G06V 20/56; G06V 10/70; G06V 2201/08

(Continued)

(56) References Cited

U.S. PATENT DOCUMENTS 10,319,094 B1    6/2019  Chen et al.
10,475,208 B1 *  11/2019  Morrison ............... G06V 20/52
(Continued)

FOREIGN PATENT DOCUMENTS

WO    WO 2020/077449 A1    4/2020

OTHER PUBLICATIONS cardr.com Inc, "The Science of Car Inspection," CarDr.com Inc, 2021, retrieved from Internet website: https://cardr.com/science/ on May 18, 2021, 6 pages.

(Continued)

*Primary Examiner* — Tyler D Paige
(74) *Attorney, Agent, or Firm* — Leydig, Voit & Mayer, Ltd.

(57) ABSTRACT

Aspects of the present disclosure relate to automated vehicle condition grading. In examples, a set of images for a vehicle are processed using a machine learning engine to generate an optical vehicle condition grade for each image of the set. The resulting set of optical vehicle condition grades may be aggregated to generate an aggregate optical vehicle condition grade for the vehicle. In some examples, additional information associated with the vehicle is processed, which may be used to generate an adjustment grade. Accordingly, the adjustment grade and the aggregate optical vehicle condition grade are used to generate a final vehicle condition grade for the vehicle. The final vehicle condition grade is associated with the vehicle in a vehicle condition grade data store for subsequent use by the vehicle grading service and/or by an associated client device, among other examples.

16 Claims, 8 Drawing Sheets

Related U.S. Application Data

(60) Provisional application No. 63/094,407, filed on Oct. 21, 2020.

(51) Int. Cl.
*G06N 20/20* (2019.01)
*G06V 20/56* (2022.01)

(58) Field of Classification Search
USPC .......................................................... 701/23
See application file for complete search history.

(56) References Cited

U.S. PATENT DOCUMENTS

| | | |
|---|---|---|
| 10,692,242 B1 | 6/2020 | Morrison et al. |
| 10,740,891 B1 | 8/2020 | Chen et al. |
| 10,791,265 B1 | 9/2020 | Lambert et al. |
| 10,814,800 B1 | 10/2020 | Gould |
| 10,846,716 B1 | 11/2020 | Chow et al. |
| 11,159,715 B1 | 10/2021 | Lambert |
| 11,377,117 B2 | 7/2022 | Caswell et al. |
| 2017/0147990 A1 | 5/2017 | Franke et al. |
| 2020/0034934 A1 | 1/2020 | Kroell et al. |
| 2020/0285970 A1 | 9/2020 | Dagley et al. |
| 2021/0073746 A1 | 3/2021 | Tang et al. |
| 2021/0118017 A1 | 4/2021 | Price et al. |
| 2022/0119003 A1* | 4/2022 | Caswell ................. G06N 20/20 |

OTHER PUBLICATIONS

Gongqi et al., "A New Model for Residual Value Prediction of the Used Car Based on BP Neural Network and Nonlinear Curve Fit," 2011 Third International Conference on Measuring Technology and Mechatronics Automation, IEEE, pp. 682-685 (2011).

* cited by examiner

| Grade | Description | Vehicle Panels (Images) | Drivability | Airbags | Additional Damage (Beyond Images) |
|---|---|---|---|---|---|
| 0 | Non-repairable | No reusable parts | Very likely stationary - does not start or run | Deployed | Interior / mechanical damage very likely |
| 10 | Severe Damage | Damage spans across panels, minimal reusable parts | Likely stationary - does not start or run | Majority deployed | Interior / mechanical damage very likely |
| 20 | Major Damage | Damage to several panels. Equal to or less than 50% of the vehicle is deemed salvageable. | Likely vehicle starts but does not run | Majority deployed | Interior / mechanical damage likely |
| 30 | Moderate Damage | Some damage but most of panels are intact and properly aligned. Equal to or more than 50% of the vehicle is deemed salvageable | Likely vehicle starts and/or runs | Few deployed | Interior / mechanical damage likely |
| 40 | Minor Damage | Dents, major scratches, light wear, minimal damage | Starts and runs | Mostly intact | Unlikely |
| 50 | No Damage | Minor scratches, normal wear & tear | Starts and runs | Intact | Unlikely |

FIG. 5A

| GRADE | DESCRIPTION | VEHICLE PANELS | DRIVABILITY | AIRBAGS | ADDITIONAL DAMAGE |
|---|---|---|---|---|---|
| 0/9 | Non-repairable | Damage spans across panels including front end impact, parts very likely damaged or missing | Very likely stationary | Majority Deployed | Interior / mechanical damage very likely |
| 10/19 | Severe Damage | Damage spans across panels, minimal reusable parts | Likely stationary | Majority Deployed | Interior / mechanical damage very likely |
| 20/29 | Major Damage | Damage likely spans across multiple panels but may be intact | Likely vehicle starts but does not run | Majority Deployed | Interior / mechanical damage likely |
| 30/39 | Moderate Damage | Some damage but most panels are intact and aligned | Likely vehicle starts and/or runs | Few Deployed | Interior / mechanical damage likely |
| 40/49 | Minor Damage | Dents, major scratches, light wear | Starts and runs | Mostly Intact | Unlikely |
| 50 | Little Damage | Minor scratches, normal wear & tear | Starts and runs | Intact | Unlikely |

FIG. 5B

AUTOMATED VEHICLE CONDITION GRADING

CROSS-REFERENCE TO RELATED APPLICATION

This application is a continuation of U.S. patent application Ser. No. 17/506,698, titled "Automatic Vehicle Condition Grading," filed Oct. 21, 2021, which claims priority to U.S. Provisional Application No. 63/094,407, titled "Automatic Vehicle Condition Grading," filed on Oct. 21, 2020, the entire disclosure of which is hereby incorporated by reference in its entirety.

BACKGROUND

Manually determining the condition grade of a vehicle may be a time-consuming process, potentially requiring an individual to evaluate the vehicle using a multipoint inspection process to ultimately arrive at a condition grade. Such an involved process may require a large amount of time, which may contribute to increased costs and bottlenecks, among other detriments.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to automated vehicle condition grading. In examples, a set of images for a vehicle are processed using a machine learning engine to generate an optical vehicle condition grade for each image of the set. The resulting set of optical vehicle condition grades may be aggregated to generate an aggregate optical vehicle condition grade for the vehicle. In some examples, additional information associated with the vehicle is processed, which may be used to generate an adjustment grade. Accordingly, the adjustment grade and the aggregate optical vehicle condition grade are used to generate a final vehicle condition grade for the vehicle. The final vehicle condition grade is associated with the vehicle in a vehicle condition grade data store for subsequent use by the vehicle grading service and/or by an associated client device, among other examples.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIGS. 5A and 5B illustrate overviews of example vehicle condition grading schemes according to aspects described herein.

DETAILED DESCRIPTION

Figure 1:
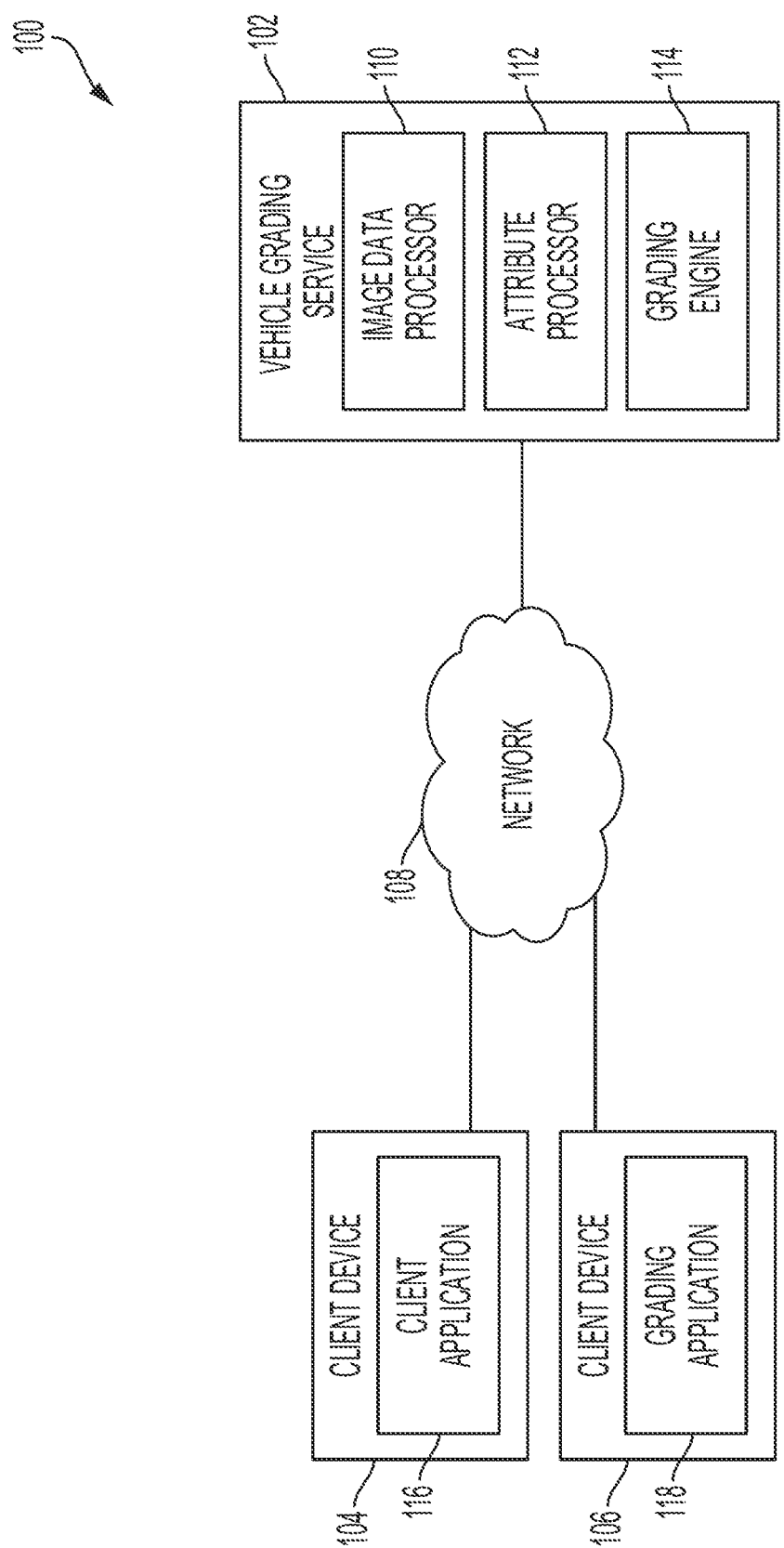
FIG. 1 illustrates an overview of an example system for automated vehicle condition grading.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Determining a condition grade for a vehicle is beneficial for a variety of reasons. For example, the condition grade may affect the vehicle sale price or aid a buyer in identifying vehicles of a certain condition, among other examples. However, objectively gauging a vehicle's condition (and an associated degree of damage) can be an arduous task. For example, while performing an extensive multi-point inspection (e.g., such as for a written estimate of the estimated cost of repair or actual cash value) may result in a thorough evaluation of the vehicle, the process may difficult, inaccurate, and time-consuming.

Accordingly, aspects of the present disclosure relate to techniques for automated vehicle condition grading. In examples, a machine learning engine is used to process a set of images associated with a vehicle and generate a vehicle condition grade for the vehicle. The automated vehicle condition grading techniques described herein may be applied to any of a variety of vehicles, including, but not limited to, sedans, trucks, crossover vehicles, sport utility vehicles, electric vehicles, or fuel-powered vehicles. In some instances, the generated vehicle condition grade is a salvage condition grade for the vehicle. It will be appreciated that while examples are described with respect to a set of images, any of a variety of other optical data may be used in addition to or as an alternative to an image, such as a video or a video stream.

A set of images may be captured for a vehicle, where the set of images comprises each of the four corners of the vehicle (e.g., the driver front corner, the passenger front corner, the driver rear corner, and the passenger rear corner). The machine learning engine processes the set of image data to grade each image accordingly. The resulting set of optical vehicle condition grades may be aggregated into an aggregate optical vehicle condition grade for the vehicle. In some examples, each optical vehicle condition grade may further have an associated optical vehicle condition subgrade, such that the vehicle condition grades and associated subgrades are used to generate the aggregated optical vehicle condition grade for the vehicle. In some examples, the aggregate optical vehicle condition grade is adjusted based on additional information associated with the vehicle, thereby generating a final condition grade for the vehicle. In other examples, the aggregate optical vehicle condition grade is not adjusted and is instead used as the final condition grade for the vehicle. The final condition grade is stored in a vehicle condition grade data store, where it is associated with the vehicle to which it relates (e.g., by a VIN number or by a unique identifier).

The machine learning engine may have been trained using training data comprising one or more sets of annotated images. Each set of annotated images is associated with a given vehicle, where each image in the set is annotated with a condition grade for the perspective of the vehicle shown in the image. Thus, an image of the front driver side of the vehicle may exhibit extensive damage and may therefore receive a low condition grade, while an image of the rear passenger side of the same vehicle may be undamaged and may therefore receive a high condition grade. It will be appreciated that, in addition to the aspects described with respect to the training dataset, model types, parameters, and other associated machine learning model attributes may be tuned or otherwise adjusted to improve model performance, for example more generally or with respect to one or more specific contexts.

The training dataset may comprise sets of images for vehicles in varying conditions (e.g., ranging from severely damaged vehicles to clean or otherwise pristine vehicles). In some instances, images of the training dataset may be preprocessed to improve the performance of a machine learning model, for example to adjust brightness, contrast, or perform edge detection, among other examples. As another example, the different conditions may be similarly represented in the training dataset in order to reduce bias of the machine learning engine and better "balance" the dataset. The training dataset may be generated from pre-existing data for vehicles that were already processed using an intake process (e.g., that have an associated condition grade that was determined according to a multi-point inspection). As another example, new sets of images may be captured and annotated accordingly.

The automated vehicle condition grading techniques described herein provide numerous benefits. For example, the disclosed aspects may facilitate accurate and consistent identification of damage to a vehicle, as well as an estimation as to the degree of damage. Additionally, the cost and/or time associated with objectively grading a vehicle may be significantly reduced, especially as compared to completing a multi-point evaluation of the vehicle. This further enables a greater volume of vehicles to be processed.

FIG. 1 illustrates an overview of an example system 100 for automated vehicle condition grading. As illustrated, system 100 comprises vehicle grading service 102, client device 104, client device 106, and network 108. In examples, vehicle grading service 102, client device 104, and client device 106 communicate via network 108, which may comprise a local area network, a wireless network, or the Internet, or any combination thereof, among other examples.

Vehicle grading service 102 may comprise a server computing device or may be a set of computing devices that form a distributed computing device. Client devices 104 and 106 may each be any of a variety of computing devices, including, but not limited to, a mobile computing device, a laptop computing device, a tablet computing device, or a desktop computing device. It will be appreciated that while system 100 is illustrated as comprising one vehicle grading service 102 and two client devices 104 and 106, any number of such elements may be used in other examples. Further, the functionality described herein with respect to vehicle grading service 102 and client devices 104 and 106 may be distributed among or otherwise implemented on any number of different computing devices in any of a variety of other configurations in other examples.

Client device 106 is illustrated as comprising grading application 118. In examples, grading application 118 is a native application executing on client device 106. In other examples, grading application 118 may be a web application or a combination of a native application and a web application, among other examples. Grading application 118 may communicate with vehicle grading service 102 using an application programming interface (API).

Grading application 118 enables a user of client device 106 to capture the set of images associated with a vehicle. In some instances, grading application 118 displays image capture instructions to the user, such that the user captures a specific set of images of the vehicle.

The set of images may be transmitted from grading application 118 to vehicle grading service 102. In some examples, the user of client device 106 inputs additional information about the vehicle into grading application 118. For example, grading application 118 may prompt the user to input additional information relating to vehicle mileage, body type (e.g., two-door or four-door), an engine status code, a primary and/or secondary damage code, a vehicle age, an odometer reading type code, whether the vehicle currently runs, the vehicle identification number (VIN), and/or whether one or more airbags have deployed. Accordingly, the additional information may be communicated to vehicle grading service 102 alongside the set of image data. In some instances, at least a part of the vehicle information is collected automatically by client device 106 (e.g., as may be collected from the vehicle using the (on-board diagnostics) OBD-II standard). Below is an example of the information that may be provided by grading application 118 to vehicle grading service 102. While the example is in JavaScript Object Notation, it will be appreciated that any of a variety of formats may be used.

```
{Vehicles[
    Stock Number: 12345
    Stock URLS: {
        URL1: "http://url_to_driverfront_image",
        URL2: "http://url_to_driverrear_image",
        URL3: "http://url_to_psngrfront_image",
        URL4: "http://url_to_psngrrear_image" }
    Stock Attributes: {
        Body Type Code: "4W",
        Engine Status Code: "CV",
        Damage Code Primary: "FD",
        Damage Code Secondary: "VB",
        Age: 9,
        Mileage: 90000,
        Loss Type Code: "PO",
        Odometer Reading Type Code: "MN",
        Is Run and Drive at Checkin: 1,
        Is Airbag Deployed: 0 }
]}
```

Vehicle grading service 102 comprises image data processor 110, attribute processor 112, and grading engine 114. As described above, image data processor 110 processes a set of images associated with a vehicle to generate an aggregate optical vehicle condition grade for the vehicle. Accordingly, image data processor 110 processes each image of the set of images that was received from grading application 118. Image processor 110 may generate an optical vehicle condition grade for each image of the set of images. As an example, image data processor 110 may generate an optical vehicle condition grade from 0 (non-repairable) to 50 (no damage). For instance, a set of discrete scores may be used (e.g., 0, 10, 20, 30, 40, and 50) or, as another example, the optical vehicle condition grade may be any of the values between 0 and 50 (examples of which are shown in FIG. 5B). It will be appreciated that any of a variety of other grading schemes may be used. In examples, optical vehicle condition grades and associated optical vehicle condition subgrades may be generated for each perspective depicted by the set of images. Examples of such aspects are described below in greater detail with respect to FIG. 2B. The resulting set of optical vehicle condition grades (and, in some examples, optical vehicle condition subgrades) may be aggregated to generate an aggregate optical vehicle condition grade for the vehicle.

In some instances, a weighted average or a regression model is used to generate the aggregate optical vehicle condition grade, where grades of images relating to certain regions of the vehicle are weighted more heavily than other images. For example, if the vehicle is a fuel-powered vehicle, a higher weight may be placed on condition grades relating to the front of the vehicle, as any associated damage may indicate a larger reduction in value as a result of potential damage to the engine. Such a weighting may not be applied to an electric vehicle, where damage near the wheel wells (e.g., near the electric motors) or undercarriage (e.g., near the battery) of the vehicle may instead be indicative of decreased value. As another example, image data processor 110 may provide a confidence score in association with an optical vehicle condition grade for a given image, such that grades having a lower confidence score may be weighted lower than grades having a higher confidence score. Thus, it will be appreciated that any of a variety of techniques may be used to generate a set of vehicle condition grades and aggregate the set of vehicle condition grades accordingly.

If image data processor 110 generates an optical vehicle condition grade with a confidence score below a predetermined threshold, an indication may be provided to grading application 118 to capture a replacement image or to manually enter a condition grade for the image. As another example, the image may be sent to another client device for manual processing. In some examples, generated optical vehicle condition grades and an associated set of image data are subsequently used to retrain the machine learning model applied by image data processor 110, such that the ability of image data processor 110 to generate optical vehicle condition grades with a high degree of confidence may improve over time.

Attribute processor 112 processes additional information associated with the vehicle. For example, attribute processor 112 may process the additional information that was received in association with the set of image data that was received from grading application 118. As another example, attribute processor 112 accesses information associated with the vehicle from any of a variety of other sources. Attribute processor 112 processes the additional information to generate an adjustment grade. The adjustment grade may be generated using one or more statistical models and/or machine learning models. For example, a regression may be performed to determine an effect of mileage on a vehicle condition grade, such that an odometer value that was received from grading application 118 is factored into the adjustment grade accordingly. It will be appreciated that different techniques may be applied depending on a make or model of vehicle. For example, what may be considered a high mileage value for one vehicle may be average for another, such that the mileage value may have a different effect on the resulting adjustment grade.

Grading engine 114 generates a final vehicle condition grade for a vehicle. For example, grading engine 114 receives an aggregate optical vehicle condition grade from image data processor 110 and an adjustment grade from attribute processor 112. Accordingly, grading engine 114 combines the two values in order to generate the final vehicle condition grade. In examples, the final vehicle condition grade is provided to grading application 118. As another example, the final vehicle condition grade is stored in a vehicle condition grade data store of vehicle grading service 102, such that it may be retrieved (e.g., using the VIN of the vehicle or a unique identifier). In some instances, vehicle grading service 102 may further provide a client device with condition grades and associated confidence scores for each image in the set of images, the aggregate optical vehicle condition grade, and/or the adjustment grade.

Client device 104 is illustrated as comprising client application 116. Client application 116 may be a web browser, a native application, or a combination thereof. In examples, client application 116 is used to access a vehicle details page for a vehicle graded by vehicle grading service 102. Accordingly, client application 116 may render a webpage received from vehicle grading service 102 or may populate fields of a native application with values received via an API, among other examples. Client application 116 may display a final vehicle condition grade (e.g., as may have been generated by grading engine 114) for the vehicle. In some examples, client application 116 receives a selection from the user to display additional information relating to the final vehicle condition grade. Accordingly, client application 116 may display additional information that was used to generate the vehicle condition grade, such as at least a subset of images used to generate the vehicle condition grade (e.g., as were received from grading application 118 by vehicle grading service 102) and/or at least a part of the additional information processed by attribute processor 112 (e.g., as may have been received from grading application 118 and/or accessed from a another data source). In some instances, a respective optical condition grade and/or other information may be shown in association with each of the displayed images.

It will be appreciated that usage of the vehicle condition grade by client application 116 is provided as an example and the vehicle condition grade may further be utilized in any of a variety of other contexts. For example, the vehicle condition grade may be displayed (e.g., by client application 116) to a potential buyer as part of an auction to assist in bidding, pricing, and negotiating. As another example, the vehicle condition grade may be included as a feature in a vehicle merchandising platform (e.g., which may further include vehicle images, vehicle information, and personalization functionality). A user may view a list of available vehicles and may filter or sort the list of vehicles according to a respective vehicle condition grade. Additionally, a recommendation engine may incorporate a vehicle condition grade in order to better provide a set of recommended vehicles to a potential buyer. As a further example, the vehicle condition grade may be incorporated into a report about the vehicle.

For a seller of the vehicle, the vehicle condition score may be incorporated into a model that is used to generate a predicted value for the vehicle (e.g., as may be presented via client application 116). Additionally, the vehicle condition grade may be incorporated into a market value interface in order to offer an insight into the severity of the vehicle's condition. The vehicle condition grade may further be displayed as part of a vehicle stock attribute screen or may be included in an inspection report. For example, such aspects may be offered via a seller platform that enables a seller to manage an inventory of vehicles and obtain reports, among other examples.

Finally, vehicle grading service 102 may utilize a generated vehicle condition grade when generating reports and analytics, as well as for setting reserves on purchase agreement vehicles. Additionally, the vehicle condition grade may be displayed via an internal inventory management engine, which may store or otherwise manage seller profiles, contract and pricing information, buyer profiles, licensing information, and/or tower profiles and pricing schedules.

Additionally, while system 100 is illustrated in the context of client-server interactions (e.g., between client devices 104 and 106, and vehicle grading service 102), it will be appreciated that any of a variety of other techniques may be used. For example, at least a part of the functionality described above may be implemented using a cloud service provider (e.g., MICROSOFT AZURE or AMAZON WEB SERVICES). For example, the cloud service provider may host a structured query language (SQL) database or a graph database that tracks, monitors, and stores job requests relating to generating vehicle condition grades. The cloud services provider may further implement at least a part of the machine learning aspects (e.g., model training, model inferencing, and/or classifying) described herein and may further provide an API to access such machine learning functionality. Additionally, elastic services provided by the cloud service provider may enable the vehicle grading service to scale up or down as necessary in response to demand load.

Figure 2A:
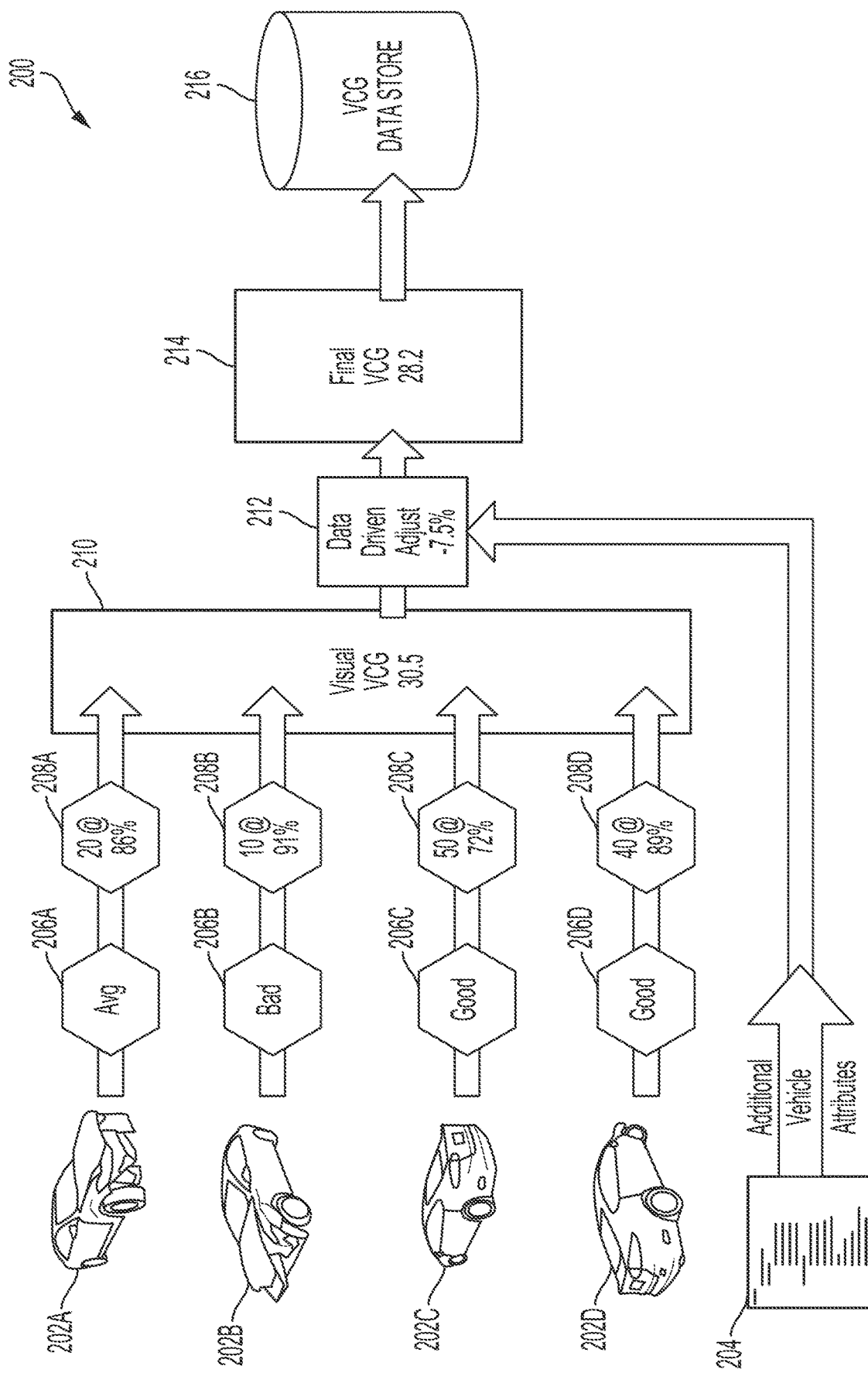
FIG. 2A illustrates an overview of an example method for generating a vehicle condition grade according to aspects described herein.

FIG. 2A illustrates an overview of an example method 200 for generating a vehicle condition grade according to aspects described herein. As illustrated, vehicle images 202A-202D are received (e.g., from grading application 118 in FIG. 1) and processed (e.g., by image data processor 110) to generate condition grades 206A-206D. As illustrated, condition grades 206A-206D range between bad, average and good. Condition grades 208A-208D are provided as an example of a numeric grading scheme (e.g., 0-50) and further comprise a confidence score associated with each respective image. For example, grade 208B indicates that image 202B received a grade of "10" with a confidence score of 91%.

Aggregate optical vehicle condition grade 210 illustrates that the aggregate of grades 208A-208D is 30.5 (e.g., based on a weighted combination of grades 20 @ 86%, 10 @ 91%, 50 @ 72%, and 40 @ 89%). Additional vehicle attributes 204 are illustrated as being processed (e.g., by attribute processor 112 in FIG. 1) to generate an adjustment grade 212 of −7.5% which is used in combination with aggregate optical vehicle condition grade 210 (e.g., as may be performed by scoring engine 114) to generate a final vehicle condition grade 214 of 28.2. As described above, the final vehicle condition grade may be stored in VCG data store 216 for later retrieval (e.g., for use by a buyer, seller, or vehicle grading service).

Figure 2B:
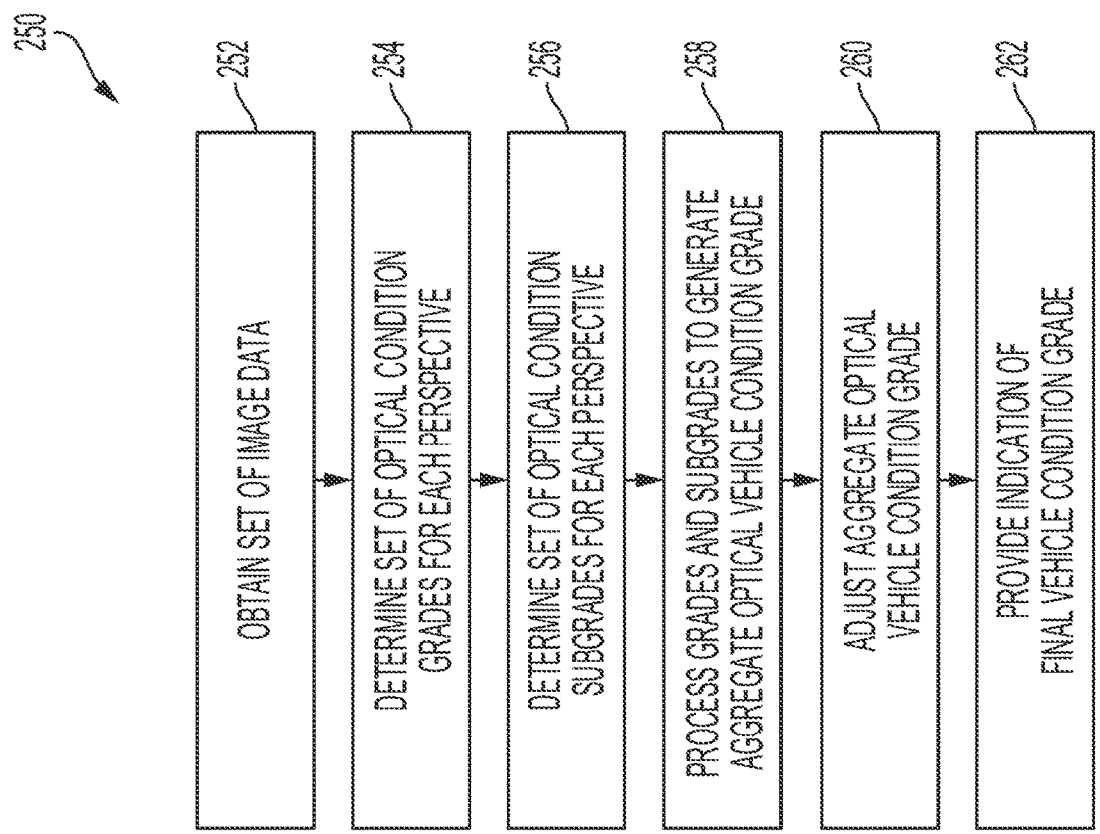
FIG. 2B illustrates an overview of an example method for generating a vehicle condition grade according to aspects described herein.

FIG. 2B illustrates an overview of an example method 250 for generating a vehicle condition grade according to aspects described herein. In examples, aspects of method 250 are performed by a vehicle grading service, such as vehicle grading service 102 discussed above with respect to FIG. 1.

Method 250 begins at operation 252, where a set of image data is obtained. For example, the image data may be obtained from a data store (e.g., of the vehicle grading service) or from a grading application of a client device (e.g., grading application 118 of client device 106), among other examples. As discussed above, the set of image data may include one or more images associated with one or more perspectives of a vehicle (e.g., the driver front corner, the passenger front corner, the driver rear corner, and the passenger rear corner).

Flow progresses to operation 254, where a set of optical condition grades is determined for each perspective of the obtained image data. Aspects of operations 254, 256, and/or 258 may be performed by an image data processor, such as image data processor 110 discussed above with respect to FIG. 1. In some instances, each perspective may have an associated set of machine learning models, each of which may be used to generate an optical vehicle condition grade for image data of the perspective accordingly.

As an example, the set of machine learning models may include a "good" machine learning model (e.g., trained to identify images depicting a vehicle in good condition), an "average" machine learning model (e.g., trained to identify images depicting a vehicle in average condition), and a "bad" machine learning model (e.g., trained to identify images depicting a vehicle in bad condition). For each perspective of the obtained image data, the good, average, and bad machine learning models may be applied to generate a set of optical vehicle condition grades accordingly. Thus, in an example where the set of image data includes image data for four perspectives, the result of operation 254 may be 12 optical vehicle condition grades including a good vehicle condition grade, an average vehicle condition grade, and a bad vehicle condition grade for each of the four perspectives.

Moving to operation 256, a set of optical vehicle condition subgrades is determined for each perspective. In examples, a model applied at operation 254 (e.g., that generates an optical vehicle condition grade) may have a set of associated models with which a set of optical vehicle condition subgrades may be generated. For example, a "good" machine learning model may have a subgrade model associated with a score of "50" and a subgrade model associated with a score of "40." Similarly, an "average" machine learning model may have a subgrade model associated with a score of "30" and a subgrade model associated with a score of "20." Finally, a "bad" machine learning model may have a subgrade model associated with a score of "10" and a subgrade model associated with a score of "0."

Thus, subgrade models associated with a machine learning model may generate a probability of a specific subgrade for a given optical vehicle condition grade. Returning to the above example, "good" may be associated with a score of 50 or 40, "average" may be associated with a score of 30 or 20, and "bad" may be associated with a score of 10 or 0. In examples, a subgrade model may generate a likelihood of a discrete score (e.g., 0, 10, 20, 30, 40, or 50). As another example, each subgrade model may generate an optical vehicle condition subgrade within a predetermined range (e.g., 0-9, 10-19, 20-29, 30-39, 40-49, and 50) and, in some instances, an associated likelihood of the generated subgrade. Accordingly, if image data for a perspective is classified as being "good" with a likelihood of 40%, "average" with a likelihood of 30%, and "bad" with a likelihood of 10% (thus summing to 100%), subgrade models associated with the "average" condition grade may similarly allocate the "average" likelihood between either a vehicle condition subgrade of a 20 or a 30 (similarly summing to 100%).

Returning to the example described above with respect to FIG. 2A, grades 206A-D may be optical vehicle condition grades, while grades 208A-D may be optical vehicle condition subgrades in some examples. It will therefore be appreciated that a model processing result associated with a subgrade model may offer a further refinement of an optical vehicle condition grade generated by a machine learning model applied at operation 254.

Flow progresses to operation 258, where the grades and subgrades generated at operations 254 and 256, respectively, are processed to generate an aggregate optical vehicle condition grade. As discussed above, a weighted average or a regression model may be used to generate the aggregate optical vehicle condition grade in some examples. As another example, a machine learning model may be used to process the grades and subgrades in order to generate the aggregate optical vehicle condition grade accordingly. While example models and associated submodels are described, it will be appreciated that any of a variety of alternative scoring techniques, scales or ranges, and associated machine learning models may be used in other examples.

At operation 260, the aggregate optical vehicle condition grade may be adjusted, for example based on an adjustment grade generated by an attribute processor (e.g., attribute processor 112 discussed above with respect to FIG. 1). As discussed above, one or more attributes associated with a vehicle may be indicative of a condition that may be underrepresented or not depicted by the set of image data. Thus, operation 260 may account for such a vehicle condition using the adjustment grade. Aspects of operation 260 may be performed by a grading engine, such as grading engine 114.

Moving to operation 262, an indication of the final vehicle condition grade is provided, for example to a grading application (e.g., grading application 118 of client device 106). In other examples, the final vehicle condition grade may be stored in a data store of a vehicle grading service (e.g., vehicle grading service 102), among other examples. Method 250 ends at operation 262.

As a result of using such a multi-tiered structure of machine learning models associated with grades and subgrades, a machine learning model may be more accurate with respect to its associated grade. For example, training data for multiple subgrades may be used to train the model accordingly. Similarly, such aspects may reduce a cost or one or more other difficulties associated with obtaining a sufficient quantity of training data. It will be appreciated that aspects of the present disclosure offer these and other technical benefits.

Figure 3:
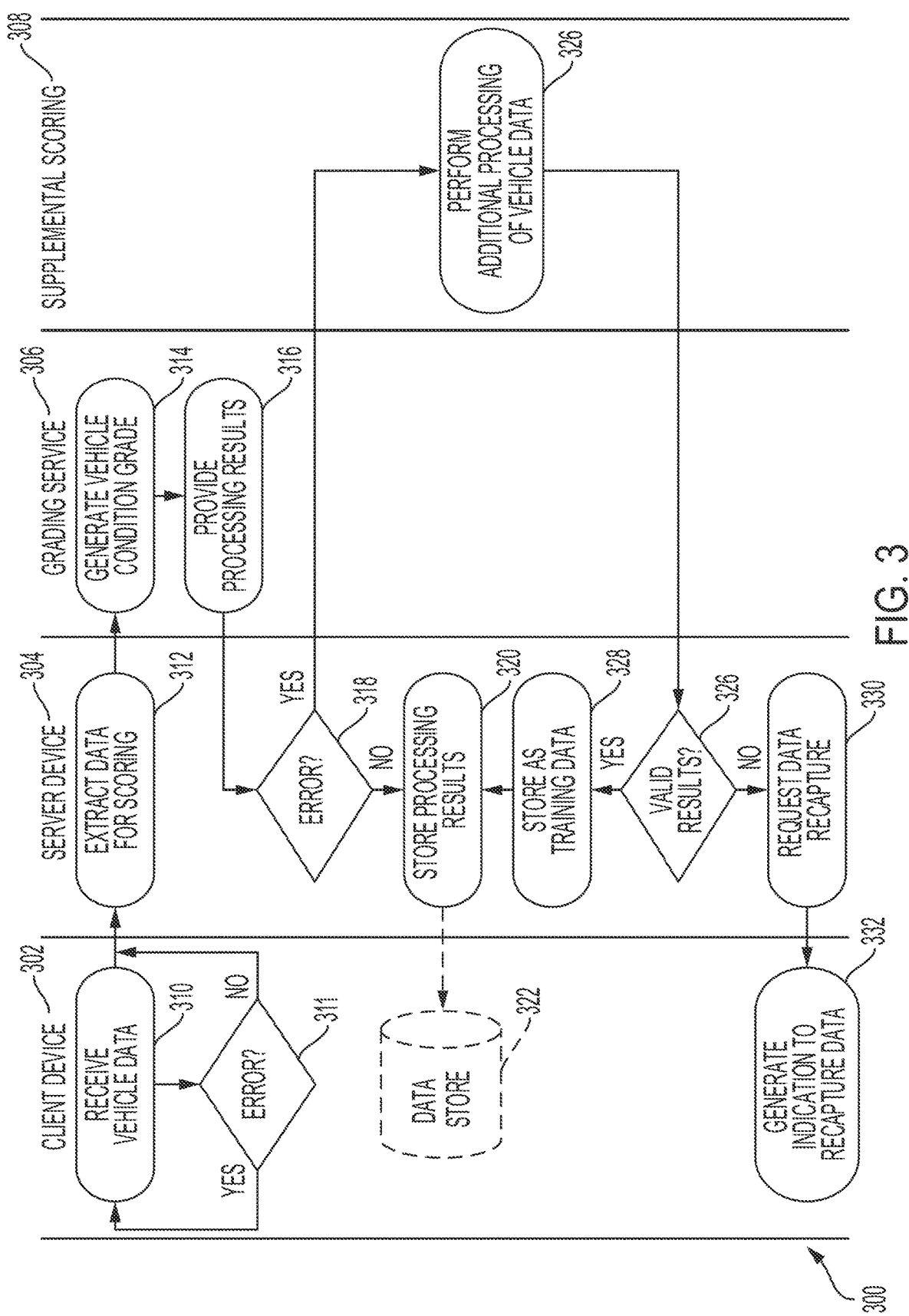
FIG. 3 illustrates an overview of another example method for generating a vehicle condition grade according to aspects described herein.

FIG. 3 illustrates an overview of another example method 300 for generating a vehicle condition grade according to aspects described herein. As illustrated, server device 304 may perform aspects similar to vehicle grading service 102 in FIG. 1. Additionally, image grader 306 may perform aspects similar to image data processor 110 in FIG. 1.

Method 300 begins at operation 310, where vehicle data is received, for example from a grading application of a client device (e.g., grading application 118 of client device 106 in FIG. 1). At determination 311, client device 302 determines whether there is an error. For example, it may be determined that a captured image is not well-lit, that the image was captured from an incorrect perspective, or that additional vehicle data is needed, among other examples. If it is determined that an error is present, flow branches "YES" and returns to operation 310, where the identified error may be addressed by a user of client device 302. In examples, an indication of the identified error and/or one or more recommendations to address the error may be presented.

However, if it is instead determined that an error is not present, flow branches "NO," such that the vehicle data is provided to server device 304, where it is processed for scoring at operation 312. Accordingly, grading service 306 processes the extracted data and generates a vehicle condition grade at operation 314. In examples, operation 314 comprises performing aspects of methods 200 and/or 250 discussed above with respect to FIGS. 2A and 2B, respectively.

At operation 316, processing results are provided to server device 304, where it is determined whether an error has occurred at determination 318. It will be appreciated that any of a variety of determinations may be made at determination 318. For example, grading service 306 may provide an indication that additional image data is needed (e.g., of a different vehicle perspective or having better lighting). As another example and as discussed above, if a confidence score is below a predetermined threshold, it may similarly be determined that an error has occurred.

As a result, if it is determined that an error has not occurred, flow branches "NO" to operation 320, where processing results are stored. FIG. 3 depicts the processing results being stored at client device 302 in data store 322. It will be appreciated that the processing results may alternatively or additionally be stored by server device 304 and/or grading service 306, among other examples. Further operation 320 may further comprise providing the processing results for display (e.g., by client device 302).

Returning to determination 318, if it is instead determined that an error has occurred, flow branches "YES" to operation 326, such that the image data may be passed to supplemental scoring 308, where additional processing is performed at operation 326. In examples, operation 326 comprises providing an indication to a user that the image data is to be manually evaluated by the user (e.g., of client device 104 or 106 in FIG. 1). In other examples, operation 326 may comprise evaluating the image data using a different machine learning model and/or performing any of a variety of processing on the image (e.g., adjusting contrast, brightness, or sharpness), among other examples. Thus, as a result of operation 326, a vehicle condition grade may be obtained, even in instances where processing at operation 314 may yield results that are unreliable or unusable.

The results of the processing at operation 326 are received by server device 304 and processed to determine whether the results are valid at determination 326. In some instances, the manual scoring may result in a user indicating new or additional vehicle data is needed, such that it may be determined that the results are not valid.

Accordingly, flow branches "NO" to operation 330, where a request to recapture data is generated at operation 330, thereby causing client device 302 to generate an indication to recapture data at operation 332. In examples, operation 332 comprises providing an indication as to what type of data should be captured, for example a perspective of a vehicle and/or a display of an image that should be retaken, among other examples. Once new or additional vehicle data is captured, method 300 may again be performed, beginning at operation 310.

Returning to determination 326, if it is instead determined that the results are valid, the manually processed vehicle data is stored as training data (e.g., with which to retrain a machine learning model, as may be applied by operations 254 and/or 256 discussed above with respect to FIG. 2B). Flow then progresses to operation 320, which was discussed above.

While method 300 is described between client device 302, server device 304, grading service 306, and supplemental scoring 308, it will be appreciated that the described operations may be divided among similar or different elements according to any of a variety of other paradigms. For example, server device 304 and grading service 306 may be provided by the same computing device or set of computing devices. As another example, aspects discussed above with respect to supplemental scoring 308 and client device 302 may be performed by the same computing device in some instances.

Further it will be appreciated that determinations 311, 318, and 326 are provided as example determinations where the quality or usability of vehicle data and/or processing results may be evaluated. Other examples may include fewer, alternative, or additional determinations, as may be performed by client device 302, server device 304, and/or grading service 306. For instance, determination 311 may comprise processing at least a part of the vehicle data according to a machine learning model that is the same as or similar to a machine learning model applied by grading service 306 (e.g., at operation 314), such that it may be determined at client device 302 whether a resulting vehicle condition grade would have a low confidence, such that additional or replacement vehicle data may be obtained accordingly.

Figure 4:
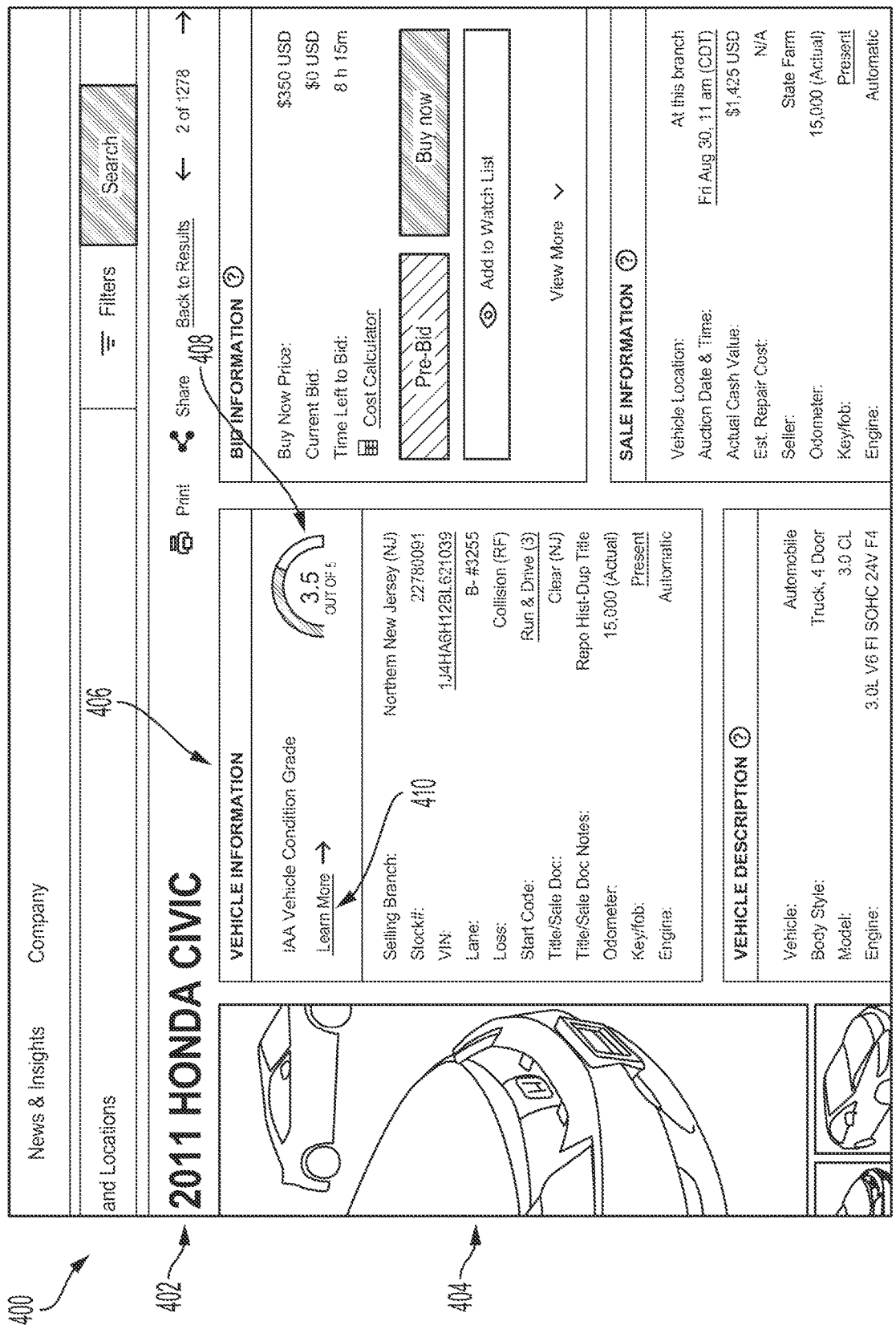
FIG. 4 illustrates an overview of an example user interface for presenting vehicle condition grade information to a user.

FIG. 4 illustrates an overview of an example user interface 400 for presenting vehicle condition grade information to a user. As illustrated, user interface 400 comprises vehicle title 402 (e.g., "2011 HONDA CIVIC"), vehicle image 404, vehicle information 406, vehicle condition grade 408, and learn more button 410. In examples, vehicle image 404 is selected from a set of images associated with the vehicle for which user interface 400 was generated (e.g., as may have been received from grading application 118 in FIG. 1). In some instances, vehicle image 404 iterates through the set of images, such that each image of the set of images is displayed for a predetermined amount of time. Additionally, a user may manually control which image is displayed as vehicle image 404.

Vehicle information 406 comprises vehicle condition grade 408, which may have been generated by a vehicle grading service, such as vehicle grading service 102 in FIG. 1. For example, vehicle condition grade 408 may be a final vehicle condition grade (e.g., based at least in part on an aggregate optical vehicle condition grade and an adjustment grade). Accordingly, a user may actuate learn more button 410 to view additional information associated with the final vehicle condition grade. For example, at least a subset of images associated with the vehicle condition grade may be displayed. In some examples, each image may be displayed with its respective optical vehicle condition grade and/or confidence score (e.g., as may have been generated by image data processor 110 in FIG. 1). As another example, at least a part of the additional information that was processed by an attribute processor (e.g., attribute processor 112 in FIG. 1) to generate an adjustment grade may be presented. It will be appreciated that user interface 400 is provided as an example and that, in other examples, alternative user input methods and/or user experience techniques may be used.

FIGS. 5A and 5B illustrate overviews of example vehicle condition grading schemes 500 and 550 according to aspects described herein. In some instances, aspects of grading scheme 500 or grading scheme 550 may be presented when a user actuates learn more button 410 in FIG. 4. Grading schemes 500 and 550 each comprise grade column 502, description column 504, vehicle panels column 506, drivability column 508, airbags column 510, and additional damage column 512. In examples, columns 506-512 may be used by a user that is manually grading an image in order to determine a grade to associate with an image that will be used as training data. While example grades and associated condition information are illustrated in grading schemes 500 and 550, it will be appreciated that any of a variety of other schemes may be used. For example, a different scheme may be used to annotate training data and train a machine learning model accordingly, such that the machine learning model subsequently classifies images according to the different scheme.

Figure 6:
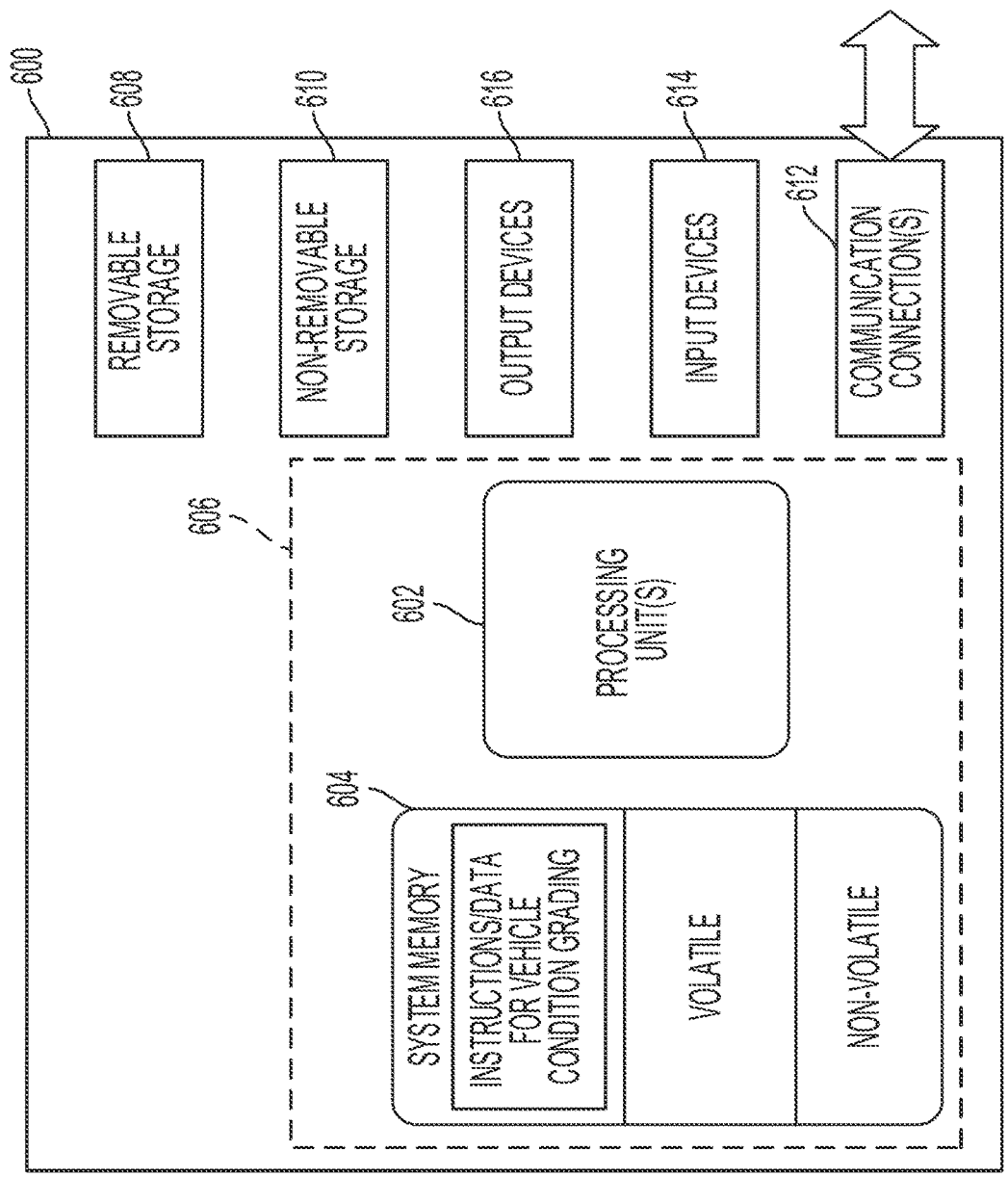
FIG. 6 illustrates an example of a suitable operating environment in which one or more aspects of the present application may be implemented.

FIG. 6 illustrates an example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like. For example, system 100 discussed above with respect to FIG. 1 is provided as another such example of a distributed computing environment in which vehicle grading service 102 and client devices 104 and 106 may each implement aspects of operating environment 600.

In its most basic configuration, operating environment 600 typically may include at least one processing unit 602 and memory 604. Depending on the exact configuration and type of computing device, memory 604 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as a keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 may include at least some form of computer readable media. The computer readable media may be any available media that can be accessed by processing unit 602 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on the processing unit 602, program modules (e.g., applications, Input/Output (I/O) management, and other utilities) may perform processes including, but not limited to, one or more of the stages of the operational methods described herein such as the methods illustrated in FIGS. 2 and 3, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

As will be understood from the foregoing disclosure, one aspect of the technology relates to a system comprising: at least one processor; and memory storing instructions that, when executed by the at least one processor, causes the system to perform a set of operations. The set of operations comprises: accessing a set of images associated with a vehicle; processing each image of the set of images according to a machine learning model to generate a set of optical vehicle condition grades; generating, based on additional information associated with the vehicle, an adjustment grade for the vehicle; generating, based at least in part on the set of optical vehicle condition grades and the adjustment grade, a final vehicle condition grade for the vehicle; and storing the final vehicle condition grade for the vehicle in a vehicle condition grade data store. In an example, the machine learning model is one of a plurality of machine learning models; and processing each image of the set of images comprises processing each image according to each machine learning model of the plurality of machine learning models to generate multiple optical vehicle condition grades for each image. In another example, the machine learning model is further associated with a set of subgrade models; and each subgrade model of the set of subgrade models is applied to generate an optical vehicle condition subgrade for the optical vehicle condition grade generated by the machine learning model. In a further example, the final vehicle condition grade is generated based at least in part on a vehicle condition subgrade generated using the set of subgrade models. In yet another example, each machine learning model of the plurality of machine learning models is associated with a vehicle perspective; and the multiple optical vehicle condition grades are each associated with the vehicle perspective. In a further still example, the vehicle perspective is one of: a driver front corner of the vehicle; a passenger front corner of the vehicle; a driver rear corner of the vehicle, and a passenger rear corner of the vehicle. In an example, the additional information associated with the vehicle comprises one or more of: vehicle mileage; body type of the vehicle; an engine status code; a primary damage code; a secondary damage code; a vehicle age; an odometer reading type code; an indication of whether the vehicle is able to run; an identification number of the vehicle; and whether an airbag has deployed.

In another aspect, the technology relates to a method for generating a final vehicle condition grade for a vehicle. The method comprises: obtaining a set of images associated with a vehicle, wherein each image of the set of images is associated with a vehicle perspective of a set of vehicle perspectives; processing each image of the set of images according to a set of machine learning models to generate a set of optical vehicle condition grades, wherein the set of machine learning models comprises: a first machine learning model used to generate an optical vehicle condition grade in the set of optical vehicle condition grades; and a second model associated with the first machine learning model used to generate an optical vehicle condition subgrade in the set of optical vehicle condition grades; generating, based at least in part on the set of optical vehicle condition grades, a final vehicle condition grade for the vehicle; and providing an indication of the final vehicle condition grade for the vehicle to a client computing device. In an example, the first machine learning model and the second machine learning model are associated with the same vehicle perspective of the set of vehicle perspectives. In another example, the same vehicle perspective is one of: a driver front corner of the vehicle; a passenger front corner of the vehicle; a driver rear corner of the vehicle, and a passenger rear corner of the vehicle. In a further example, the final vehicle condition is generated based at least in part on additional information associated with the vehicle. In yet another example, the additional information associated with the vehicle comprises one or more of: vehicle mileage; body type of the vehicle; an engine status code; a primary damage code; a secondary damage code; a vehicle age; an odometer reading type code; an indication of whether the vehicle is able to run; an identification number of the vehicle; and whether an airbag has deployed. In a further still example, a first vehicle condition grade associated with a first vehicle perspective of the set of vehicle perspectives is weighted higher than a second vehicle condition grade associated with a second vehicle perspective of the set of vehicle perspectives to generate the final vehicle condition grade for the vehicle.

In a further aspect, the technology relates to a method for generating a final vehicle condition grade for a vehicle. The method comprises: accessing a set of images associated with a vehicle; processing each image of the set of images according to a machine learning model to generate a set of optical vehicle condition grades; generating, based on additional information associated with the vehicle, an adjustment grade for the vehicle; generating, based at least in part on the set of optical vehicle condition grades and the adjustment grade, a final vehicle condition grade for the vehicle; and storing the final vehicle condition grade for the vehicle in a vehicle condition grade data store. In an example, the machine learning model is one of a plurality of machine learning models; and processing each image of the set of images comprises processing each image according to each machine learning model of the plurality of machine learning models to generate multiple optical vehicle condition grades for each image. In another example, the machine learning model is further associated with a set of subgrade models; and each subgrade model of the set of subgrade models is applied to generate an optical vehicle condition subgrade for the optical vehicle condition grade generated by the machine learning model. In a further example, the final vehicle condition grade is generated based at least in part on a vehicle condition subgrade generated using the set of subgrade models. In yet another example, each machine learning model of the plurality of machine learning models is associated with a vehicle perspective; and the multiple optical vehicle condition grades are each associated with the vehicle perspective. In a further still example, the vehicle perspective is one of: a driver front corner of the vehicle; a passenger front corner of the vehicle; a driver rear corner of the vehicle, and a passenger rear corner of the vehicle. In another example, the additional information associated with the vehicle comprises one or more of: vehicle mileage; body type of the vehicle; an engine status code; a primary damage code; a secondary damage code; a vehicle age; an odometer reading type code; an indication of whether the vehicle is able to run; an identification number of the vehicle; and whether an airbag has deployed.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for automated vehicle condition grading, comprising:
    obtaining, by a system, training data comprising:
        sets of annotated images for a plurality of different vehicles, wherein each set of annotated images is associated with a different vehicle from the plurality of different vehicles, and
        a plurality of user grades, wherein each user grade is associated with an image from the sets of annotated images and indicates a manual grading of the image by a user;
    preprocessing, by the system, the training data to modify one or more image parameters from the sets of annotated images;
    training, by the system, one or more machine learning models using the preprocessed training data;
    obtaining, by the system and from a first client device or a data store, a set of images associated with a vehicle, the set of images being captured by at least one still camera or video camera and comprising each of the four corners of the vehicle;
    processing, by the system, the set of images using the one or more trained machine learning models to generate a set of optical vehicle condition grades, wherein each optical vehicle condition grade, of the set of optical vehicle condition grades, is associated with an image from the set of images and indicates a discrete score from a range of discrete scores that are associated with damage to the vehicle that is shown in the set of images;
    assigning, by the system, a plurality of weighted values to the set of images based on whether the vehicle includes a feature;
    determining, by the system and based on applying the plurality of weighted values to the set of optical vehicle condition grades, an aggregated optical vehicle condition grade;
    generating, by the system and based at least in part on the aggregated optical vehicle condition grade, a final vehicle condition grade for the vehicle, wherein the final vehicle condition grade indicates a degree of overall damage to the vehicle;
    determining, by the system, vehicle panel information for one or more panels of the vehicle based on the set of optical vehicle condition grades, the aggregated optical vehicle condition grade, or the final vehicle condition grade; and providing, by the system, the final vehicle condition grade and the vehicle panel information to a second client device.

2. The method of claim 1, wherein assigning the plurality of weighted values to the set of images comprises:

assigning a first weighted value to a first image of the set of images based on a first section of the vehicle shown in the first image and whether the vehicle includes the feature, wherein the first image is assigned a first value for the first weighted value based on the vehicle including the feature and is assigned a second value for the first weighted value based on the vehicle not including the feature; and assigning a second weighted value to a second image of the set of images based on a second section of the vehicle shown in the second image, wherein the second image is assigned a third value for the second weighted value regardless of whether the vehicle includes the feature.

3. The method of claim 1, wherein the vehicle panel information indicates damage to the one or more panels of the vehicle.

4. The method of claim 1, further comprising:

obtaining, from the first client device or the data store, information for a predetermined set of known parameters of the vehicle, wherein the predetermined set of known parameters comprise at least one of a vehicle body type, a vehicle door set type, a vehicle drive type, and a vehicle engine type; and determining the plurality of weighted values based on the information for the predetermined set of known parameters of the vehicle.

5. The method of claim 1, wherein the one or more trained machine learning models comprises a plurality of trained machine learning models, and wherein processing the set of images using the one or more trained machine learning models to generate a set of optical vehicle condition grades comprises:

processing each image of the set of images using a different trained machine learning model from the plurality of trained machine learning models.

6. The method of claim 5, wherein each of the plurality of trained machine learning models is further associated with a set of subgrade models, and wherein each subgrade model of the set of subgrade models is applied to generate an optical vehicle condition subgrade for the optical vehicle condition grade.

7. The method of claim 6, wherein the final vehicle condition grade is generated based at least in part on a vehicle condition subgrade using the set of subgrade models.

8. The method of claim 5, wherein each of the plurality of trained machine learning models is associated with a vehicle perspective of a plurality of vehicle perspectives, and wherein each of the set of optical vehicle condition grades is associated with a vehicle perspective of the plurality of vehicle perspectives.

9. The method of claim 8, wherein the plurality of vehicle perspectives comprises a driver front corner of the vehicle, a passenger front corner of the vehicle, a driver rear corner of the vehicle, and a passenger rear corner of the vehicle.

10. The method of claim 1, further comprising:

generating an adjustment grade for the vehicle, wherein generating the final vehicle condition grade for the vehicle is based on the adjustment grade for the vehicle, wherein the adjustment grade indicates a grade associated with historical or current attributes of the vehicle.

11. The method of claim 10, wherein generating the adjustment grade for the vehicle is based on one or more statistical models and/or one or more adjustment grade machine learning models.

12. The method of claim 10, wherein generating the adjustment grade for the vehicle is based on additional information associated with the vehicle, wherein the additional information associated with the vehicle comprises one or more of:

vehicle mileage;
body type of the vehicle;
an engine status code;
a primary damage code;
a secondary damage code;
a vehicle age;
an odometer reading type code;
an indication of whether the vehicle is able to run;
an identification number of the vehicle; and
whether an airbag has deployed.

13. The method of claim 1, wherein providing the final vehicle condition grade and the vehicle panel information to the second client device comprises:

providing the final vehicle condition grade to the second client device;

receiving a request for additional information from the second client device based on the second client device displaying the final vehicle condition grade and receiving a selection from a second user to display the additional information; and in response to receiving the request, providing the vehicle panel information to the second client device.

14. The method of claim 1, further comprising:

generating a predicted value for the vehicle based on the final vehicle condition grade; and providing the predicted value to the second client device.

15. The method of claim 1, further comprising:

obtaining, by the second client device, the final vehicle condition grade and the vehicle panel information;

generating, by the second client device and based on the final vehicle condition grade of the vehicle, a list of available vehicles according to a respective final vehicle condition grade; and displaying, by the second client device, the list of available vehicles.

16. A system for automated vehicle condition grading, comprising:

one or more processors; and a non-transitory computer-readable medium having processor-executable instructions stored thereon, wherein the processor-executable instructions, when executed by the one or more processors, facilitate:

obtaining training data comprising:

sets of annotated images for a plurality of different vehicles, wherein each set of annotated images is associated with a different vehicle from the plurality of different vehicles, and a plurality of user grades, wherein each user grade is associated with an image from the sets of annotated images and indicates a manual grading of the image by a user;

preprocessing the training data to modify one or more image parameters from the sets of annotated images;

training one or more machine learning models using the preprocessed training data;

obtaining, from a first client device or a data store, a set of images associated with a vehicle, the set of images being captured by at least one still camera or video camera and comprising each of the four corners of the vehicle;

processing the set of images using the one or more trained machine learning models to generate a set of optical vehicle condition grades, wherein each optical vehicle condition grade, of the set of optical vehicle condition grades, is associated with an image from the set of images and indicates a discrete score from a range of discrete scores that are associated with damage to the vehicle that is shown in the set of images;

assigning a plurality of weighted values to the set of images based on whether the vehicle includes a feature, comprising:
- assigning a first weighted value to a first image of the set of images based on a first section of the vehicle shown in the first image and whether the vehicle includes the feature, wherein the first image is assigned a first value for the first weighted value based on the vehicle including the feature and is assigned a second value for the first weighted value based on the vehicle not including the feature; and
- assigning a second weighted value to a second image of the set of images based on a second section of the vehicle shown in the second image, wherein the second image is assigned a third value for the second weighted value regardless of whether the vehicle includes the feature;

determining, based on applying the plurality of weighted values to the set of optical vehicle condition grades, an aggregated optical vehicle condition grade;

generating, based at least in part on the aggregated optical vehicle condition grade, a final vehicle condition grade for the vehicle, wherein the final vehicle condition grade indicates a degree of overall damage to the vehicle;

determining vehicle panel information for one or more panels of the vehicle based on the set of optical vehicle condition grades, the aggregated optical vehicle condition grade, or the final vehicle condition grade; and providing the final vehicle condition grade and the vehicle panel information to a second client device.

* * * * *